Oct. 7, 1924. 1,510,556
J. B. OWENS
TUNNEL KILN
Filed Oct. 30, 1920 2 Sheets-Sheet 1
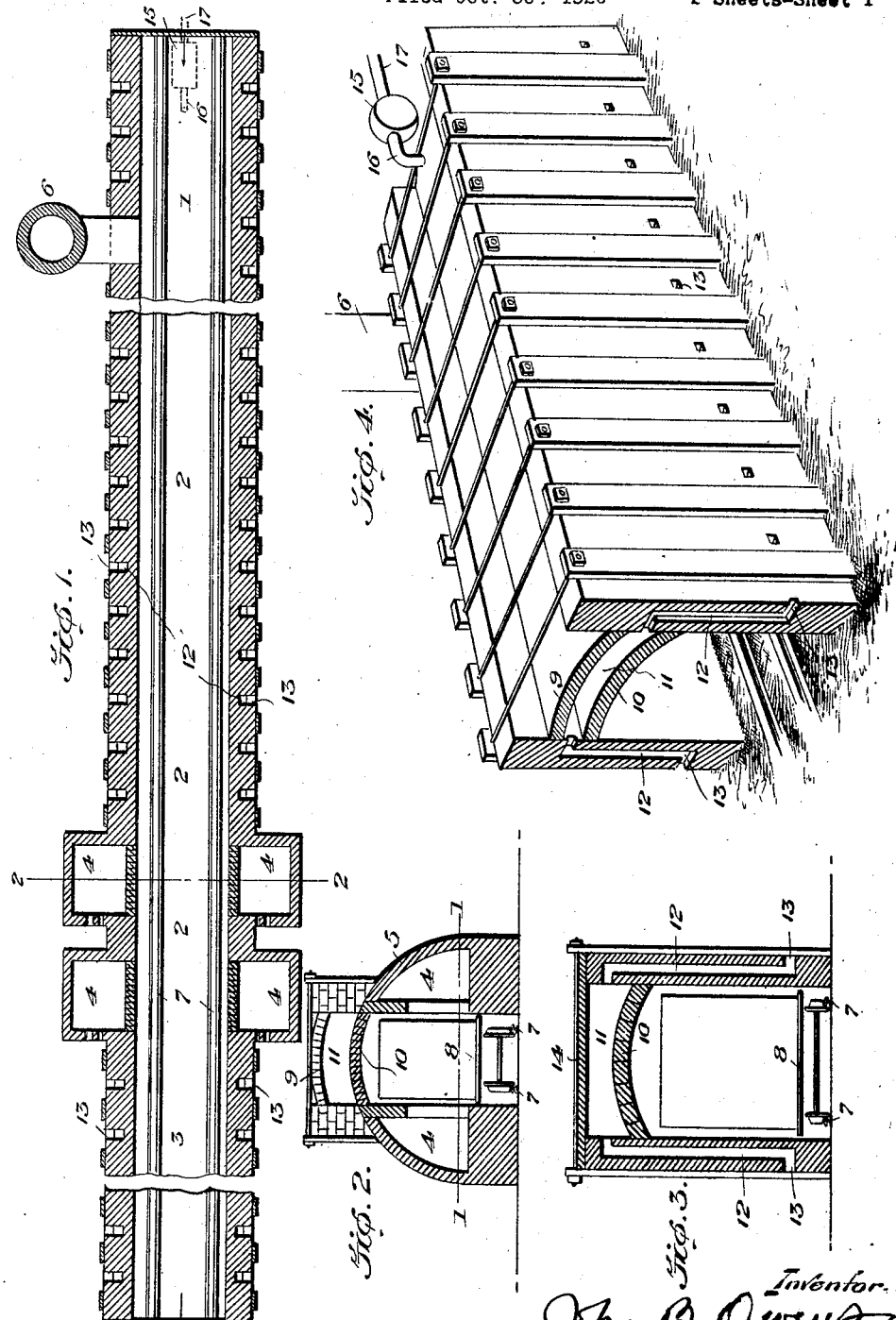

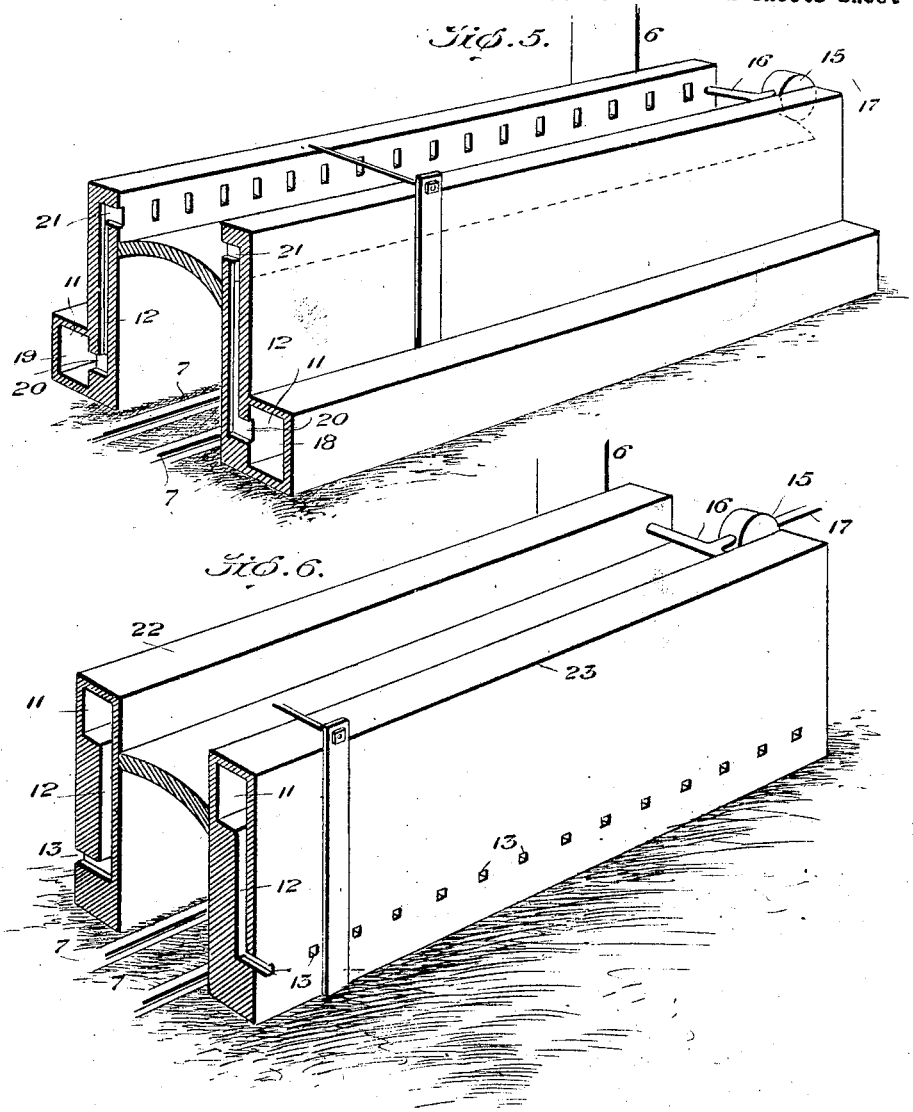

Patented Oct. 7, 1924.

1,510,556

UNITED STATES PATENT OFFICE.

JOHN B. OWENS, OF ZANESVILLE, OHIO.

TUNNEL KILN.

Application filed October 30, 1920. Serial No. 420,721.

*To all whom it may concern:*

Be it known that I, JOHN B. OWENS, a citizen of the United States, residing at Zanesville, in the county of Muskingum and State of Ohio, have invented certain new and useful Improvements in Tunnel Kilns, of which the following is a specification.

This invention relates to tunnel kilns and, more particularly, to a means and method for utilizing the radiated heat of a tunnel kiln and of the ware or product fired therein, for the purpose of drying and heating clay wares and other products, the warming of buildings, and for other purposes.

A vast amount of heat is radiated from a tunnel kiln, particularly through the crown thereof, and, in the absence of utilization, represents a very large waste. The object of my invention is to provide means and a method of utilizing this radiated heat for any useful purpose, such as hereinbefore specified. To that end I provide a heat collecting chamber or chambers extending longitudinally of the tunnel kiln, either adjacent, or over the crown of the tunnel, or along the side walls and, in connection therewith, flues in the walls of the kiln which communicate with the chamber or chambers and have inlet ends which may be disposed so as to admit outer cold air and allow it to rise into the chamber or chambers if they are on the upper part of the kiln, or, are open at their upper ends adjacent the crown of the kiln when used in connection with a chamber or chambers located along the sides of the kiln.

A suction fan or fans, located according to the desired delivery of the heat from the chamber or chambers, serve to draw upon the chamber or chambers and cause a flow of warm air to the point of utilization. Preferably a suction fan or fans will be used for this purpose, but I do not limit the invention to the use of a suction fan or fans nor to a method involving the delivery of warm air from the chamber or chambers under a pressure condition to the point where such warm air is to be utilized as any draft-inducing means may be employed. However, the use of warm air for drying and heating purposes is under very much better control when the air after being drawn out of the chamber or chambers is delivered under pressure conditions into a drier where clay products are to be dried than when such air is caused to circulate through the drier merely by virtue of a stack or ordinary suction fan. These latter methods of creating draft are liable to cause a channeling of the air currents along the lines of least resistance, whereas with a pressure condition of delivery prevailing, it is possible to fill all of the voids in, and amongst, the products to be treated.

While I have disclosed in the accompanying drawings, and hereinafter described, certain embodiments of my invention, this is done by way of illustration and not for the purpose of limiting the scope of the invention to these particular embodiment as I am well aware that my improved means and method may be carried out in other forms without departing from the essential principles thereof.

In the accompanying drawings:

Figure 1 is a longitudinal section through a tunnel kiln provided with my improvements, taken on the line 1—1, Fig. 2;

Fig. 2, a section taken on the line 2—2, Fig. 1;

Fig. 3, a cross section of the kiln showing a modification of the heat collecting chamber;

Fig. 4, a perspective view of a part of the kiln of Fig. 1 showing in cross section the wall and arch construction, flues, and heat collecting chamber;

Fig. 5, a view like Fig. 4 showing a modification having trunks arranged at the sides of the walls; and Fig. 6, a similar view showing another modification where the trunks are on top of the side walls.

Referring to the embodiment of the invention shown in Figs. 1, 2, 4, the tunnel kiln is shown of the same general construction, except for the present improvement, as appears in my earlier applications and patents in so far as it embodies a preheating zone 1, burning or firing zone 2 and cooling zone 3, the furnaces or combustion chambers appearing at 4, of which there may be any desired number, arranged in pairs, each pair having a single continuous arch 5 constituting the crown and the outer walls of the combustion chambers. The combustion chambers are fired in the direction of their lengths, that is, parallel to the tunnel. The stack is shown at 6. The rails on which the cars travel through the kiln, are shown at 7 and the cars appear at 8.

It is to be understood that reference is made to the foregoing "Owens" type of tunnel kiln to illustrate a practical embodiment of the improvements and method which will now be set forth, but I wish it understood that my present improvements are not limited to use in connection with any particular type or construction of tunnel kiln.

Referring now to the embodiment of the invention shown in Figs. 1, 2, 4, the kiln has an upper arch 9 extending the full length of the same and separated from the usual crown 10 of the tunnel, thus providing a compartment 11 which extends the full length of the tunnel and, if preferred, may be closed at both of its ends, except for suitable take off of the air by a fan or otherwise. At intervals throughout the entire length of the kiln, there are vertical flues or ducts 12 in its walls, said ducts or flues opening into the chamber 11 at their upper ends and at their lower ends extending out laterally through the side walls of the kiln as shown at 13.

The form of the invention disclosed in Fig. 3 is the same as that shown in Figs. 1, 2, 4, but in this instance instead of employing an arch 9 as the top of the chamber 11, slabs 14 are laid across the top of the kiln and supported by the side walls thereof, thus providing a chamber 11 and forming a flat top for the kiln so that it may be walked upon.

Means, such as a suction fan 15, communicates with the chamber 11 through a flue or pipe 16 and has a discharge pipe or outlet 17 for delivering the warm air from the chamber 11 to the point of utilization of this warm air as, for instance, to a drier used for drying clay products. The invention is not limited to a single fan as a plurality of fans may be used, situated and serving the purpose hereinbefore specified.

I prefer to use a fan or fans such as will deliver the warm air to the drier or other point of utilization under pressure conditions to insure the filling of all voids in, and amongst, the products to be treated but I do not limit the invention to this condition.

In the embodiments of the invention hereinbefore described, the draft effected in the chamber 11 by the use of a fan or by other means, results in cold air being drawn in through the flues 13 whence it rises in flues 12 and passes into chamber 11. As the air rises in the flues 12 it absorbs heat from the walls of the kiln and heat radiated from the ware on the cars. The heat from the crown 10 also heats the air in the chamber 11. The flues 12 which are opposite the cooling zone 3 also serve to assist in cooling of the ware without danger of injury thereto.

Referring to Fig. 5, instead of employing a single heat chamber 11 over the crown 10, I provide trunks 18, 19 flanking the side walls of the kiln and extending longitudinally the full length thereof but closed, or partially so, at their ends, or may be entirely open at their ends. These trunks define heat chambers 11 which serve the same purpose as the chambers 11 in the forms of the invention hereinbefore described. The flues 12 communicate with the chambers 11 in the trunks 18 and 19 through branches 20. The flues 12 have at their upper ends inlets 21 which open on the inside of the side walls of the kiln adjacent the crown 10.

The trunks 18 and 19 are subject to the action of one or more fans 15 such as heretofore described and for the same purpose. However, any draft-inducing means may be employed to take off the warm air in the chambers 11 and deliver it under pressure conditions, or otherwise.

The heat from the crown 5 is in large measure taken off through the mouths 21 and is drawn down through the flues 12 into the chambers 11. The heat radiated from the ware is in large measure taken up by the air passing down the flues 12. Consequently, the trunks 18, 19, contain warm air which is taken off as before described and utilized as desired. In the cooling section of the kiln the cooling of the ware is assisted by the taking off of the heat radiated therefrom through the tunnel walls into the flues 12 and thence passes to the chambers 11.

Referring to Fig. 6, there is disclosed a form of the invention which is similar to the forms shown in Fig. 1, 2, 4, except that the chamber 11 does not extend across the top of the kiln but, instead, there are two trunk flues 22, 23, surmounting the side walls of the kiln and extending the full length thereof but being open or closed, or partially so, at their ends. Chambers 11 are formed by these trunk flues and serve the purpose of the chambers 11 hereinbefore described. Flues 12 having inlets 13 are provided in the walls of the kiln. A fan or fans 15 serve to take off the warm air from the chambers 11 and deliver it under pressure conditions or otherwise to the point of utilization. The action opposite the cooling zone is as hereinbefore described.

What I claim is:

1. A tunnel kiln provided with a heat collecting chamber extending lengthwise thereof for substantially the extent of the cooling and burning zones in position to receive heat radiating from that part of the tunnel comprehending the burning and cooling zones, means for admitting outer air into said chamber, and means for inducing draft in said chamber to thereby draw outer air thereinto and to cause the warm air therein to be delivered from said chamber for utilization.

2. A tunnel kiln provided with a heat collecting chamber extending lengthwise thereof for substantially the extent of the cooling and burning zones in position to receive heat radiating from that part of the tunnel comprehending the burning and cooling zones, upwardly extending flues located at different points of the side walls of the tunnel which communicate with said chamber and also with the atmosphere, and means for causing the in-draft of outer air through said flues into the chamber and the warm air in the chamber to be delivered from said chamber from the point of utilization thereof.

3. A tunnel kiln provided with a heat collecting chamber extending lengthwise thereof for substantially the extent of the preheating and burning zones in position to receive heat radiating from that part of the tunnel comprehending the preheating and burning zones, means for admitting outer air into said chamber, and means for inducing draft in said chamber to thereby draw outer air thereinto and to cause the warm air therein to be delivered from said chamber for utilization.

4. A tunnel kiln provided with a heat collecting chamber extending lengthwise thereof for substantially the extent of the preheating and burning zones in position to receive heat radiating from that part of the tunnel comprehending the preheating and burning zones, upwardly extending flues located at different points of the side walls of the tunnel which communicate with said chamber and also with the atmosphere, and means for causing the in-draft of outer air through the said flues into the chamber and the warm air in the chamber to be delivered from said chamber from the point of utilization thereof.

5. A tunnel kiln provided with a heat collecting chamber extending lengthwise thereof for substantially the extent of the preheating, burning and cooling zones in position to receive heat radiating from that part of the tunnel comprehending the preheating, burning and cooling zones, means for admitting outer air into said chamber, and means for inducing draft in said chamber to thereby draw outer air thereinto and to cause the warm air therein to be delivered from said chamber for utilization.

6. A tunnel kiln provided with a heat collecting chamber extending lengthwise thereof for substantially the extent of the preheating, burning and cooling zones in position to receive heat radiating from that part of the tunnel comprehending the preheating, burning and cooling zones, upwardly extending flues located at different points of the side walls of the tunnel which communicate with said chamber and also with the atmosphere, and means for causing the in-draft of outer air through the said flues into the chamber and the warm air in the chamber to be delivered from said chamber from the point of utilization thereof.

In testimony whereof I affix my signature.

JOHN B. OWENS.